United States Patent [19]

Redenbarger

[11] Patent Number: 5,020,643
[45] Date of Patent: Jun. 4, 1991

[54] FLOATING FRICTION BRAKE

[75] Inventor: Philip D. Redenbarger, Centerpoint, Ind.

[73] Assignee: Motion Control Industries, Inc., Ridgway, Pa.

[21] Appl. No.: 367,415

[22] Filed: Jun. 16, 1989

Related U.S. Application Data

[63] Continuation-in-part of Ser. No. 252,326, Oct. 3, 1988, abandoned.

[51] Int. Cl.⁵ .................. F16D 65/46; F16D 65/50
[52] U.S. Cl. ............... 188/196 M; 188/72.8; 188/72.9; 188/196 V
[58] Field of Search ............ 188/71.7, 72.7, 72.8, 188/196 M, 196 V, 71.1, 71.9, 71.8, 72.9, 73.44

[56] References Cited
U.S. PATENT DOCUMENTS

| | | | |
|---|---|---|---|
| 1,609,527 | 12/1926 | Moorhouse | 188/196 M |
| 1,774,527 | 9/1930 | Sanford | 188/196 M |
| 1,800,473 | 4/1931 | Sanford | 188/196 M |
| 1,809,541 | 6/1931 | Andres et al. | 188/196 M |
| 2,001,239 | 5/1935 | Buckendale | 188/196 M |
| 2,015,881 | 10/1935 | Alden et al. | 188/79.61 |
| 2,922,317 | 1/1960 | House | 188/196 M |
| 3,003,589 | 10/1961 | Desbrow | 188/196 M |
| 3,384,203 | 4/1968 | Walther et al. | 188/73.32 |
| 3,530,493 | 9/1970 | Hollnagel | 188/72.4 |
| 3,976,168 | 8/1976 | Yamamoto | 188/72.8 |
| 4,043,433 | 8/1977 | Rainbolt | 188/73.43 |
| 4,289,309 | 9/1981 | Hoffmann | 188/72.7 |
| 4,299,311 | 11/1981 | Shirai et al. | 188/71.1 |
| 4,471,858 | 9/1984 | Kawase | 188/73.44 |
| 4,482,033 | 11/1984 | Yoshigai | 188/196 M |
| 4,624,345 | 11/1986 | Berg et al. | 188/196 M |
| 4,852,698 | 8/1989 | Nagano | 188/196 M |

Primary Examiner—Robert J. Oberleitner
Assistant Examiner—Mark T. Le

[57] ABSTRACT

A disk brake assembly wherein the floating caliper member houses an adjustable nut in which is mounted a power screw for actuating the carrier members and their brake pads into frictional engagement with a rotatable disk. The power screw has a cam connected to it, with the cam also adjustable mounted on an actuating lever to permit selected rotation of the cam to adjust the axial position of the power screw to compensate for wear.

4 Claims, 7 Drawing Sheets

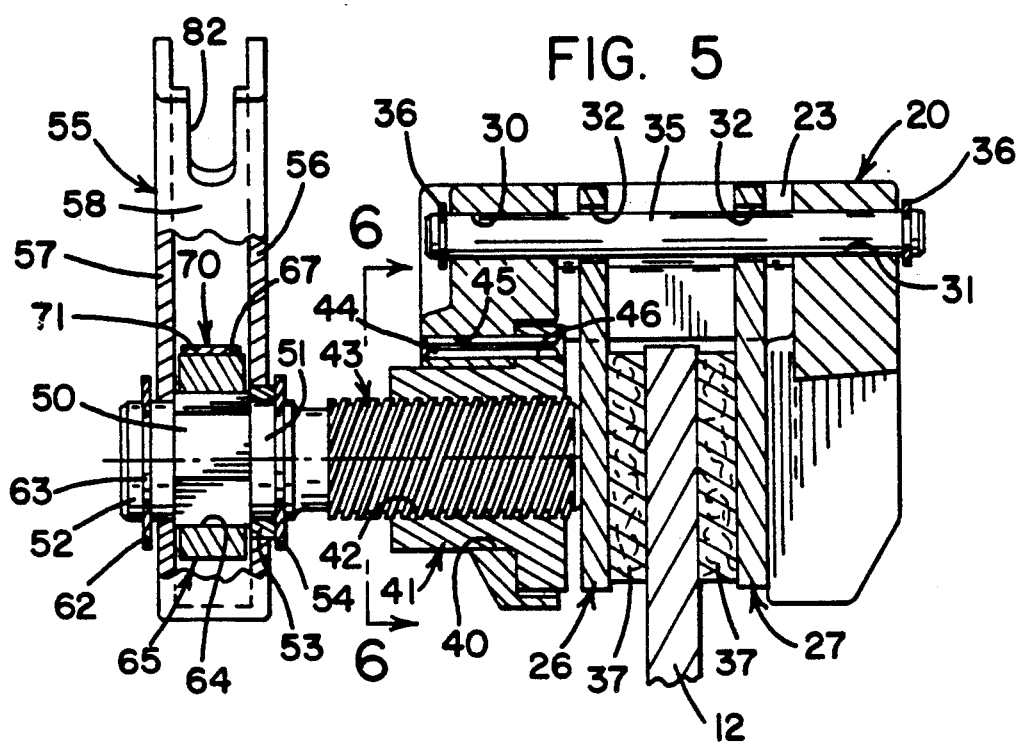

FLOATING FRICTION BRAKE

BACKGROUND OF THE INVENTION

This application is a continuation-in-part of patent application Ser. No. 252,326 filed on Oct. 3, 1988, now abandoned.

This invention relates to a disk brake and more particularly to a new and imprOved floating caliper disk brake with means to adjust for wear. Such disk brakes are widely used in motor vehicles, off-highway vehicles, golf carts, lawn mowers, snow vehicles, crane drives and on either mobile or stationary vehicles.

The caliper disk brake of the present invention is of the floating caliper type which is simple in structure and operation permitting an arrangement of elements that facilitate repair and replacement of parts including the brake pads. Of particular importance in the instant invention is the provision of means to quickly and safely adjust the braking tension.

SUMMARY OF THE INVENTION

The present invention is directed to a brake assembly for use on a single rotatable brake disk. A floating caliper member encompasses the upper portion of the disk and is connected to a stationary support to permit axial movement. The caliper member houses a stationary nut that is adjustable thereon, which nut receives the power screw which is axially movable to actuate the brake pads to apply the brakes. The brake pads are mounted on carriers which are disposed on opposite sides of the disk and are guided on the caliper member for movement to and from the brake disk. The power screw is connected to a control or actuating lever via a cam member that can adjust the rotative position of the power screw and thus the wear of the brake pads.

BRIEF DESCRIPTION OF THE DRAWINGS

FIG. 5 is a cross-sectional view taken on line 5—5 of FIG. 3 showing the actuating mechanism for the brakes;

FIG. 6 is a fragmentary side elevational view taken on line 6—6 of FIG. 5;

FIG. 7 is a cross-sectional view taken on line 7—7 of FIG. 2 showing the actuating lever;

DETAILED DESCRIPTION

Figure 1:
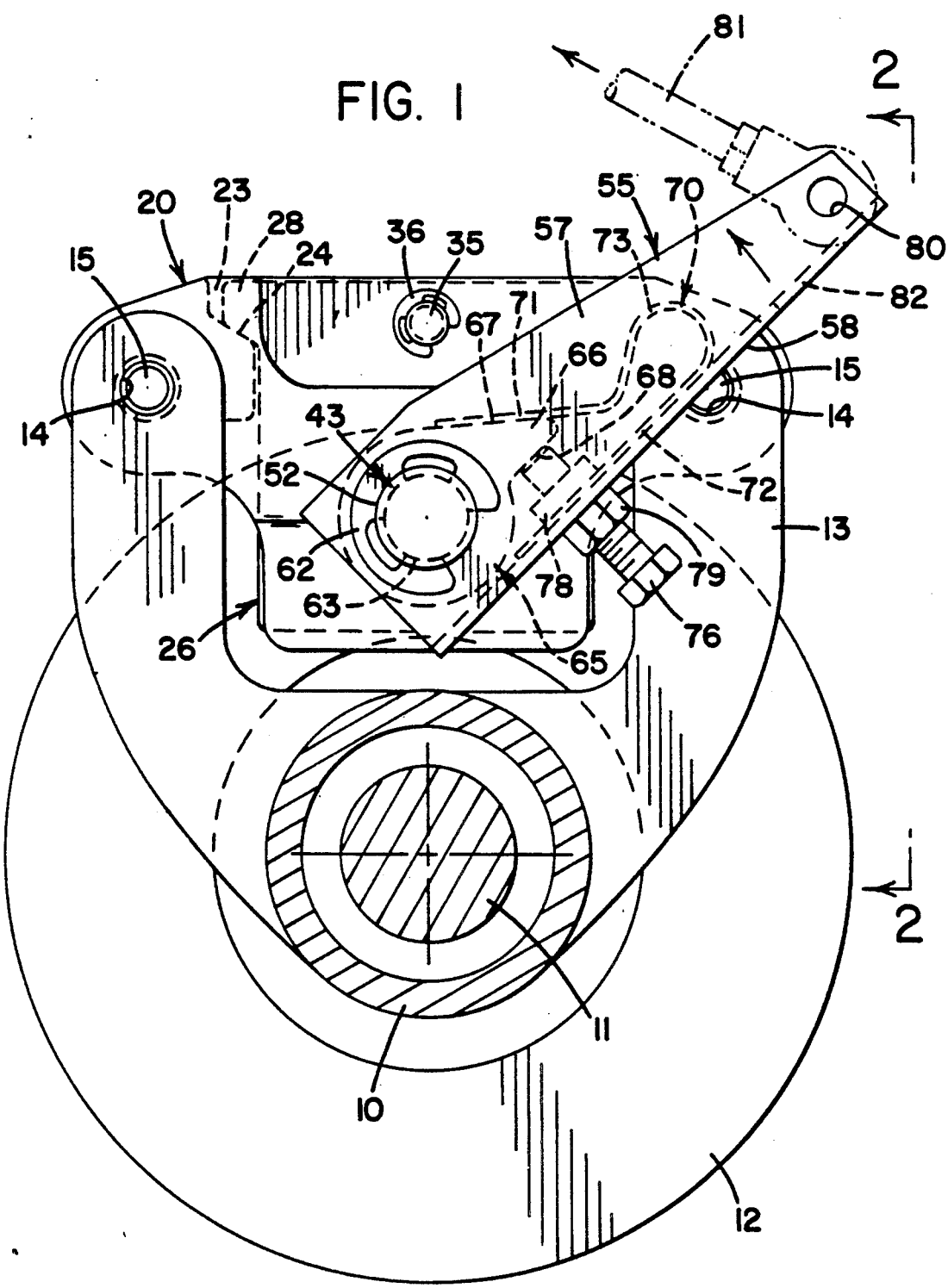
FIG. 1 is a side elevational view of a disk brake assembly made in accordance with the present invention.
Figure 2:
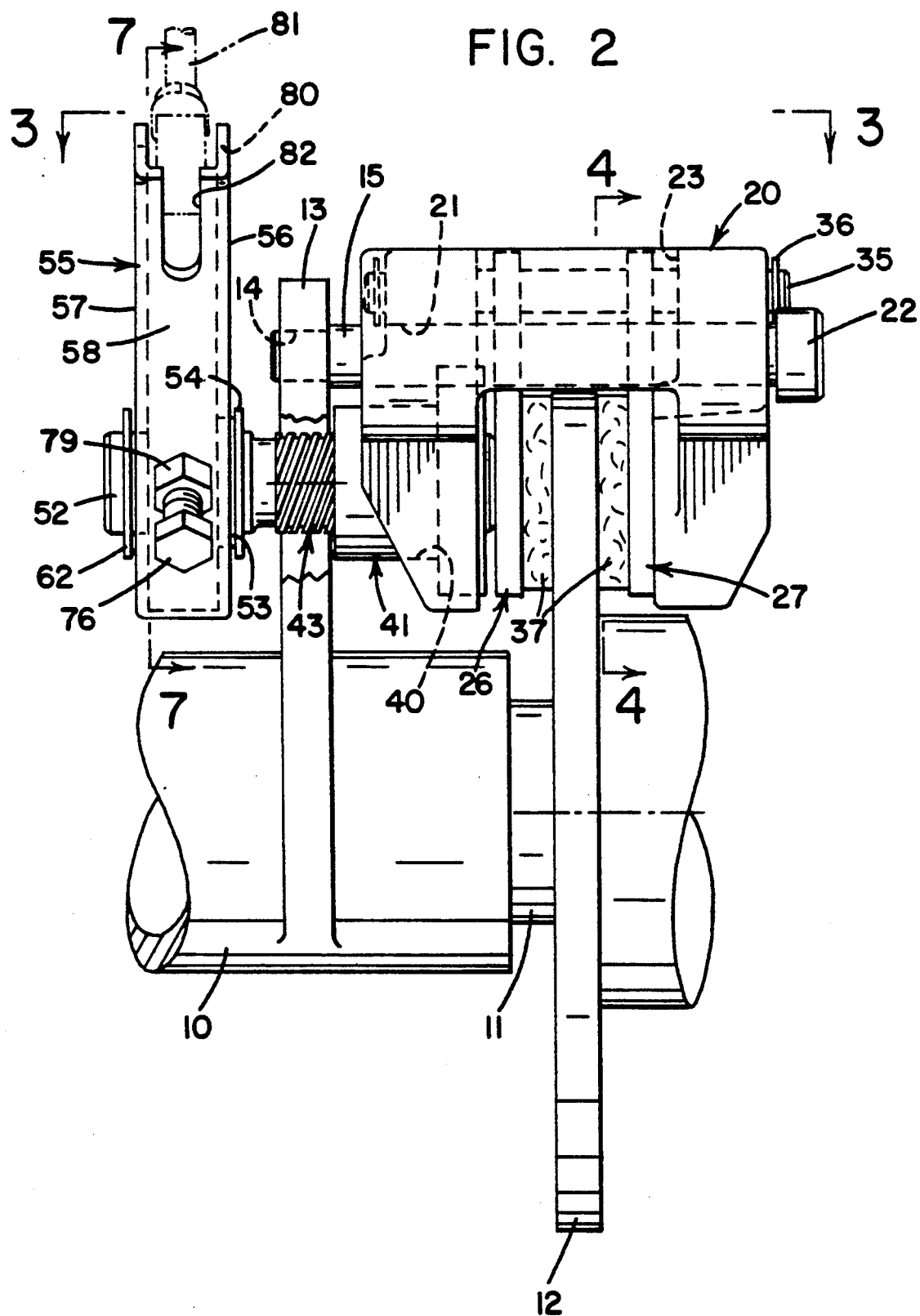
FIG. 2 is a cross-sectional view taken on line 2—2 of FIG. 1.

Referring to the drawings, wherein like reference numerals designate like or corresponding parts throughout the several views, there is shown in FIGS. 1 and 2 a stationary axle housing 10 in which is journaled for rotation an axle 11. Axle 11 has an annular brake disk or rotor 12 suitably connected thereto for rotation therewith.

Integral with the axle housing 10 is a yoke 13 having a generally U-shaped upper portion with threaded bores 14 in such respective upper portions. Pins 15 are mounted in such bores 14 and extend in an axially direction. A caliper member or housing 20 with bores 21-21 is slidably mounted on the two pins 15 and retained thereon by enlarged heads 22 on such pins 15. The caliper housing 20 can slide on such Pins between the limits of the upper portion of yoke 13 and the heads 22 of pin 15 providing a floating action.

Figure 3:
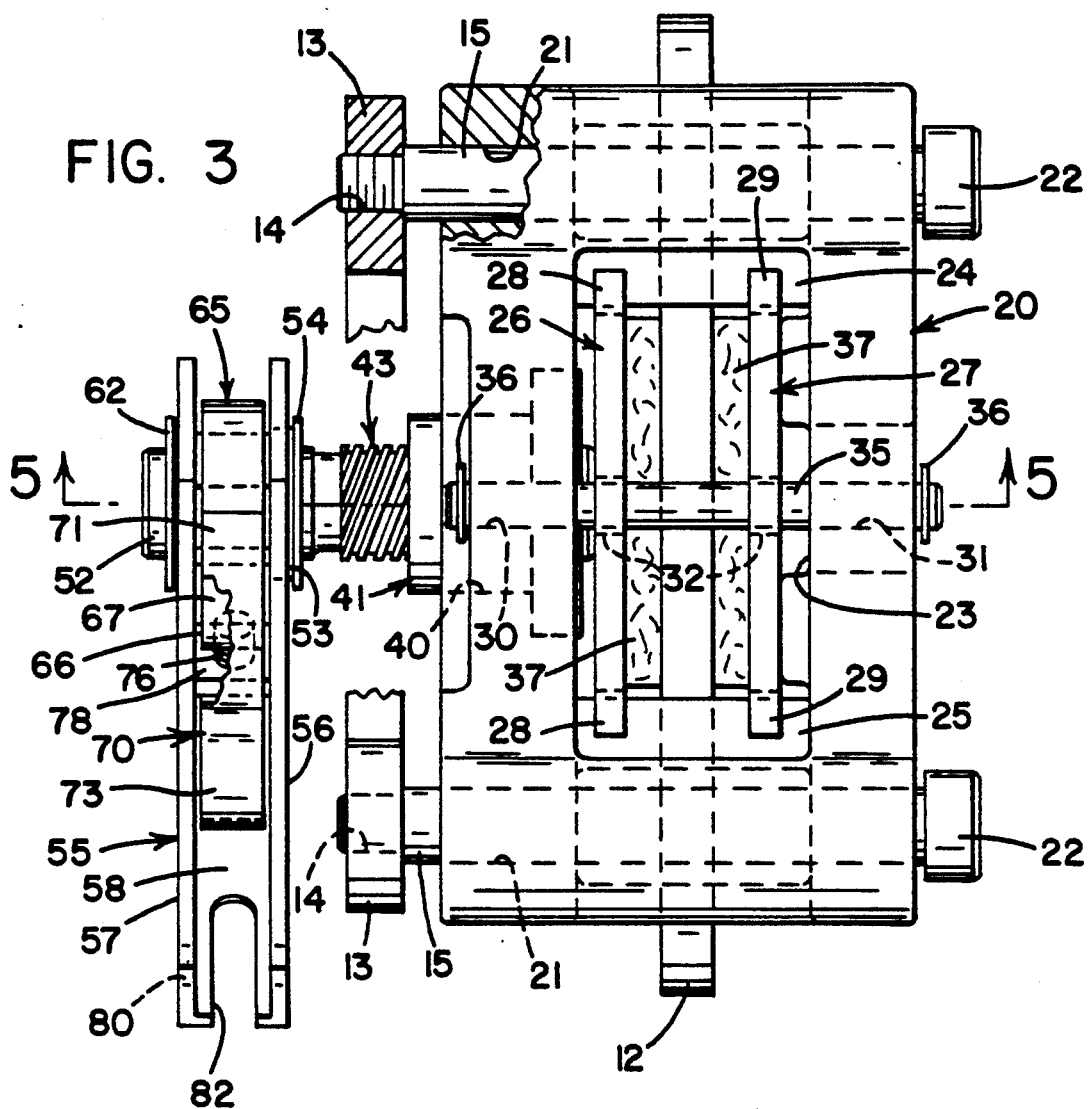
FIG. 3 is a top plan view of the disk brake assembly taken on line 3—3 of FIG. 2 with portions broken away.
Figure 4:
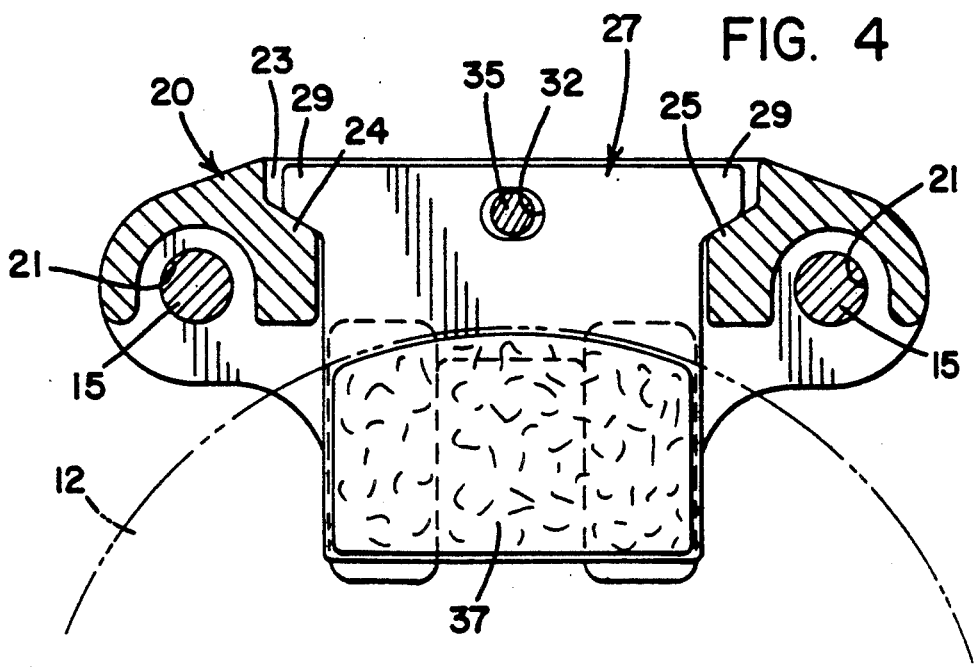
FIG. 4 is a cross-sectional view taken on line 4—4 of FIG. 2.

As seen in plan view in FIG. 3, the caliper member or housing 20 has a central recess 23 with shoulders or guideways 24-25 on opposite sides of such recess. A pair of spaced backing members, carriers or plates 26-27 with each having tapered end shoulders 28 and 29 (FIG. 5) respectively are mounted in such recess 23 with their shoulders 28-29 slidably engaging guideways or shoulders 24 and 25 on such caliper member 20. This is best seen in FIG. 4. Caliper member 20 has a pair of aligned apertures 30 and 31 in the upper portion thereof, located on opposite sides of recess 23. The spaced backing members 26-27 have aligned bores 32 that register with the aligned apertures 30 and 31 in caliper member 20. A guide pin 35 is located in such apertures 30 and 31 and the aligned bores 32 of backing members 26-27 thus allowing the guided movement of the respective backing members 26 and 27 within recess 23. The pin 35 is retained on the caliper member 20 via a pair of clips 36 engaging the respective end portion thereof. Each backing member 26 and 27 has a braking pad 37 suitably mounted thereon for engaging the rotor disk or brake disk 12 for performing the braking operation.

The one side of caliper member 20 has a central recess 40 which receives a plug or nut member 41. Nut member 41 has a threaded bore 42 which receives a threaded shaft 43. Nut member 41 is retained with the central recess 40 by a pin 44 extending through a bore 45 in the one side of caliper member 20 and with aligned bore 46 in the nut member 41 (FIGS. 5 and 6). As seen in FIG. 6, the one side of caliper member 20 has a plurality of circumferentially spaced bore 47 and 48 lying along the same arc as bore 45 to provide means for adjusting the rotative position of nut member 41. This adjustment permits the broad positioning or adjustment of the brake control lever to be described that is connected to the threaded shaft 43 to allow such control lever to be positioned for ease of operation. Additional spaced bores similar to bores 47 and 48 may be provided to facilitate a broad range of adjustments.

Figure 8:
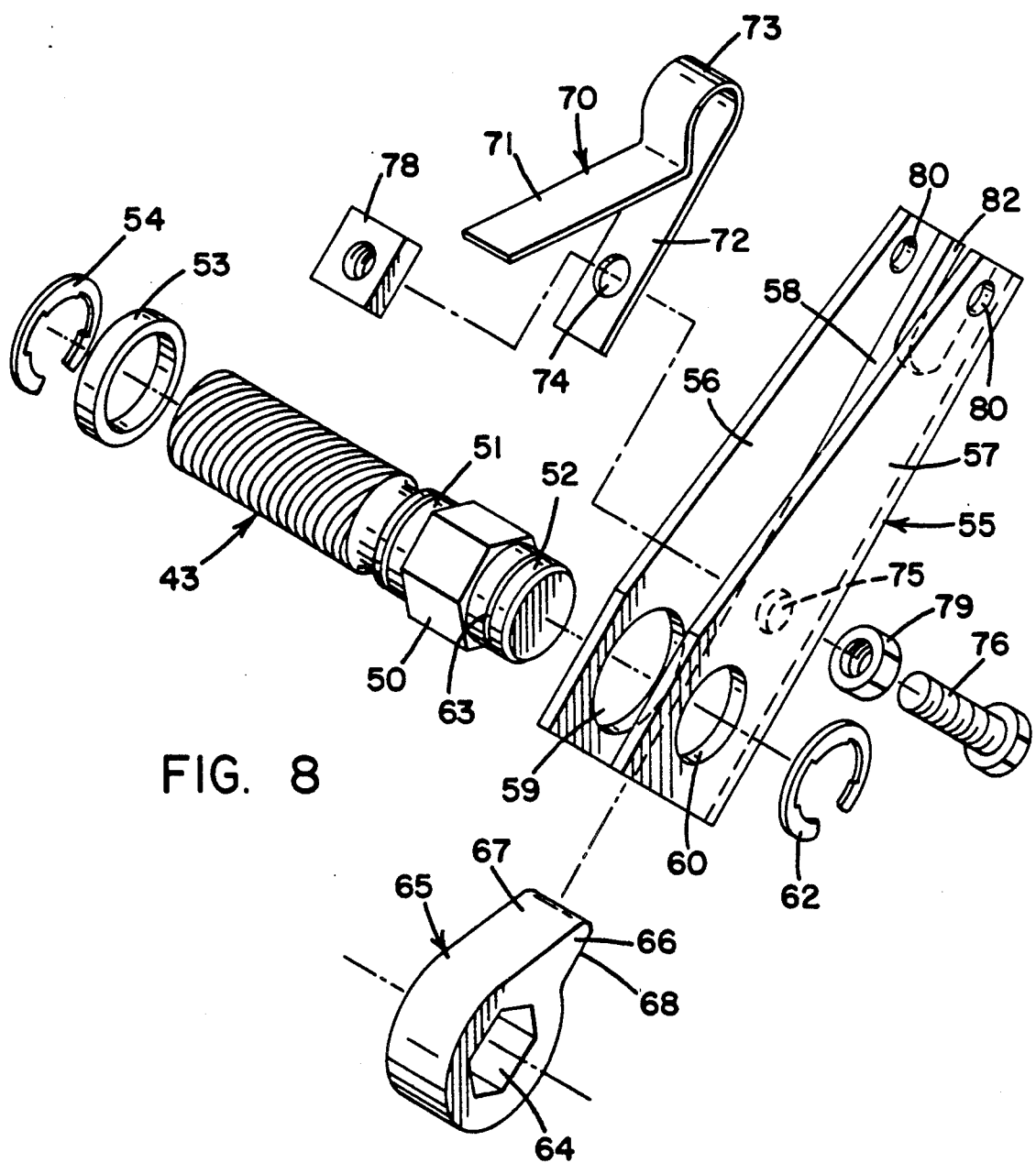
FIG. 8 is an exploded view of the actuating lever and actuating mechanism of the brake disk assembly.

Threaded shaft 43 as seen in FIG. 8 has a hexagonal end portion 50 with annular portions 51 and 52 to either side of such end portion 50. Prior to the threading of shaft 43 into the nut member 41 an annular spacer 53 and clip 54 are positioned onto the annular end portion 51, after which such shaft 43 is threaded thereinto. A U-shaped lever 55 having a pair of leg members 56-57 with a bridging portion 58 is positioned onto threaded shaft 43. Leg members 56 and 57 have aligned bores 59 and 60, with bore 59 being of a diameter to slip over the hexagonal portion 50. The spacer 53 fill the annular space between the bore 59 and the annular end portion 51, with the clip 54 being snapped into a groove on such end portion of threaded shaft 43 to retain the spacer 53 in its position thereon. The other annular end portion 52 projects into and through the smaller bore 60 in leg member 57. A clip 62 is snapped into a groove 63 (FIG. 8) in end portion 52 to retain the lever 55 on threaded shaft 43. Prior to the passing of the hexagonal portion of shaft 43 through the bore 59 of U-shaped lever 55, the hexagonal end portion 50 is passed through a hexagonal opening 64 in a cam 65, with such cam positioned in the U-shaped opening of lever 55 and with the hex opening 64 in alignment with bores 59 and 60 to thereby retain the cam within the channel of the U-shaped lever 55. Cam 65 has a projection 66 with a pair of diverging surfaces 67 and 68. Such cam 65 is essentially a sleeve with a hex opening 64 and projection 66 with surfaces 67 and 68. Surface 68 is a flat surface presenting a surface that is parallel to the bridging portion 58 on lever 55 in the original starting condition. A spring 70 having a pair of diverging flat leg portions 71-72 joined by an arcuate portion 73 is positioned onto lever 55 with one leg portion 72 lying flat against the bridging portion 58 of lever 55 while the other flat leg portion 71 of spring 70 rests against cam's planar surface 67 to bias such cam clockwise as viewed in FIGS. 1 or 7. Spring 70 has a bore 74 that registers with a bore 75 on the bridging portion 58 and is retained in position by a screw 76 that passes through bores 74 and 75. A nut 78 on the one side of spring 70 and bridging portion 58 cooperates with a nut 79 on the other side of bridging portion 58 to lock the screw 76 in a predetermined position on the lever 55. Thus the biasing action of spring 70 maintains the flat planar surface 68 of cam 65 in engagement with the one end of screw 76. To adjust the rotative position of cam 65 as well as the rotative position of power screw 43, nut 79 is loosened then screw 76 is rotated to effect a lengthening (or a shortening) of that portion of the screw 76 that projects above the bridging portion 58 of lever 55 which in effect adjusts for the wear in the brake pad 37 and moves the surface 68 of cam 65 upwardly and away its original starting condition as referred to above. To apply the brakes in the above described embodiment, lever 55 is rotated in a counterclockwise direction as viewed in FIGS. 1 and 7 whereby cam 65 imparts a rotation to the power screw 43 which translates into an axial movement and presses the threaded end against the carrier 26 and its brake pad 37 for movement against the rotor or brake disk 12. Simultaneously with this action the floating caliper member 20 is moved in an opposite direction such that the carrier 27 and brake Pad 37 is moved against the brake disk 12. Lever arm 55 has a pair of aligned bores 80 at the reduced end thereof to accommodate a connecting rod 81 that extends to an operator's position for control. In addition control lever 55 is recessed as at 82 along the bridging portion 58 adjacent such reduced end to facilitate the movement and rotation of rod 81.

Figure 9:
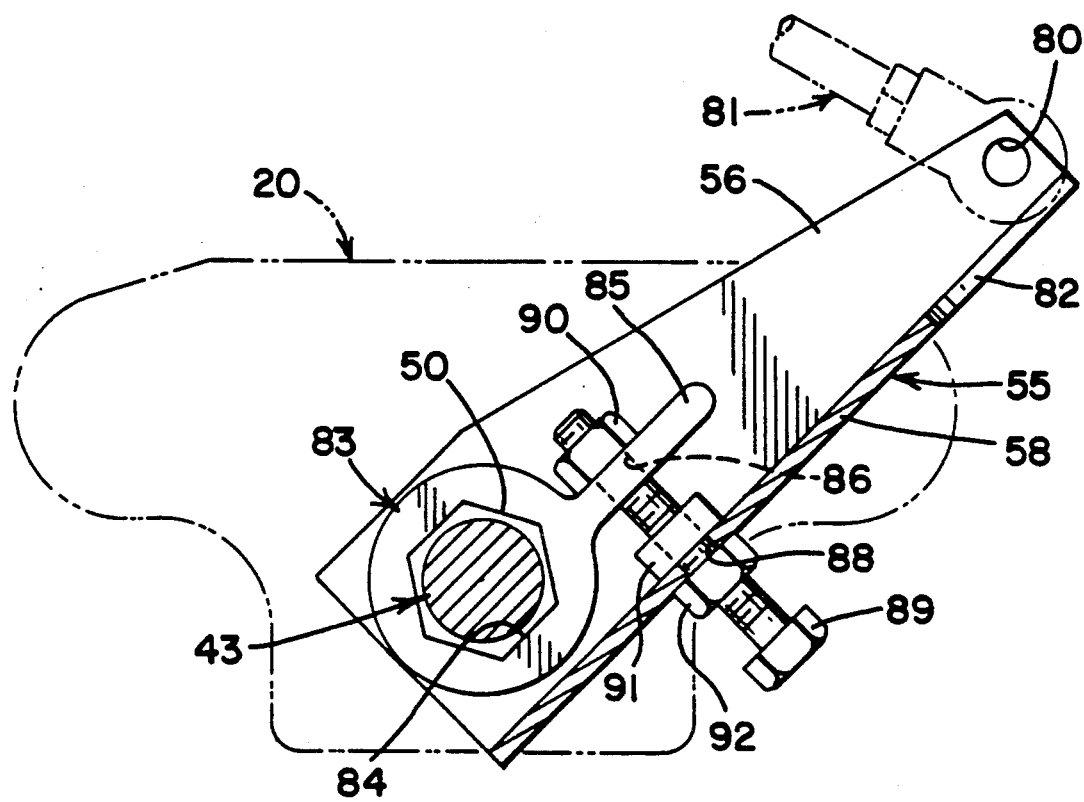
FIG. 9 is a side elevational view partly in cross-section of a modified form of the actuating lever and its actuating mechanism.
Figure 10:
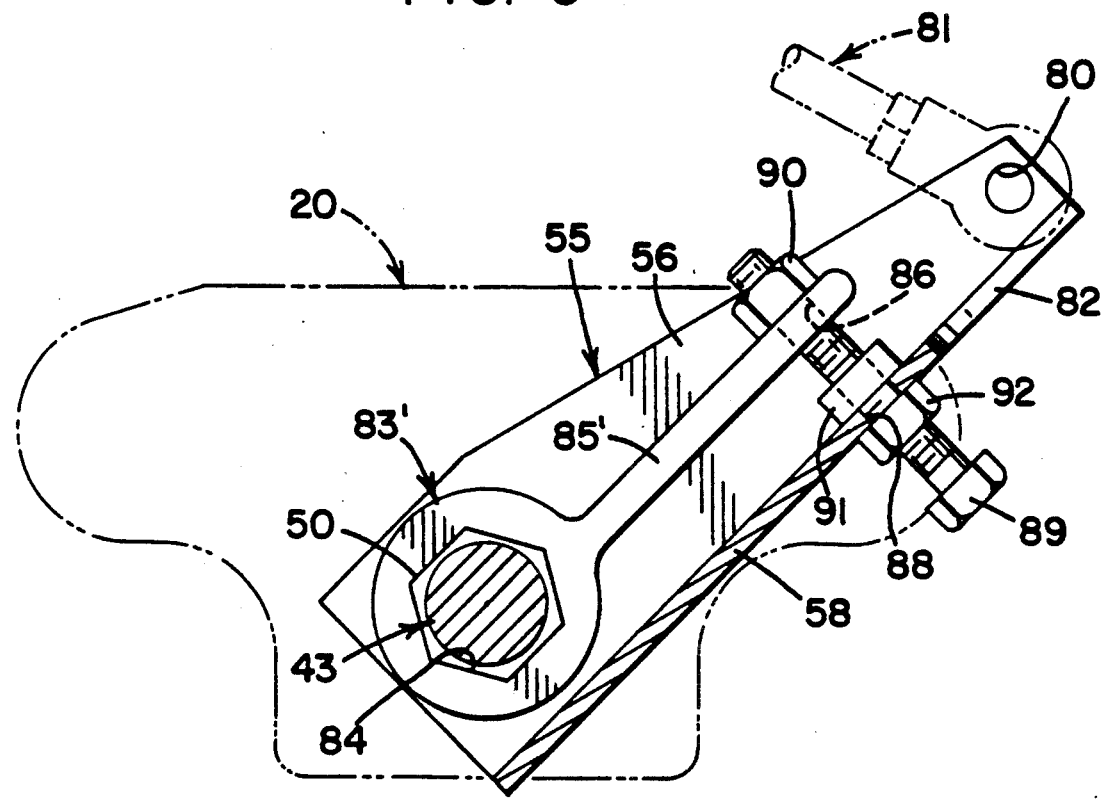
FIG. 10 is a side elevational view partly in cross-section of a further modified form of the actuating lever and its actuating mechanism.
Figure 11:
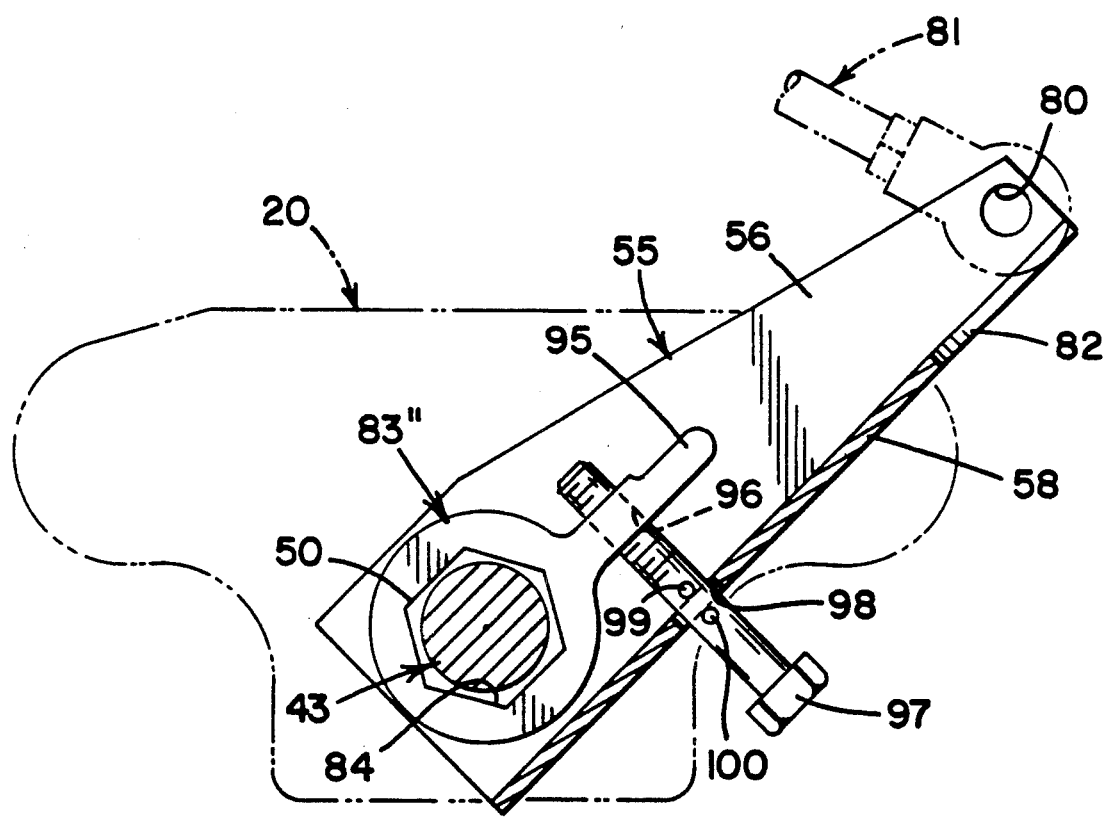
FIG. 11 is a side elevational view partly in cross-section of a further modified form of the actuating lever and its actuating mechanism.

Modifications of the adjusting means for the brake control lever is shown in FIGS. 9 through 11 wherein like elements are designated by the same reference numerals. Such modifications use the same U-shaped lever 55 with its leg members 56 and 57 connected by the bridging portion 58. As in the other embodiments, the threaded shaft or power screw 43 is connected to such lever 55 in the same manner as previously described and shown in FIG. 8 except that no spring 70 is required. For the embodiment shown in FIG. 9, in lieu of cam or sleeve 65 a circular sleeve or hub 83 with a hex opening 84 is mounted on the hexagonal end portion 50 of the power screw 43 and retained in its position thereon by the clips 54 and 62. Hub 83 has a longitudinally extending projection or arm member 85 with a bore 86 therein. The bridging member 58 of the U-shaped member 55 has a bore 88 substantially in alignment with such bore 86. Bores 86 and 88 receive an adjusting screw or threaded rod 89 with suitable nuts 90, 91 and 92 mounted thereon to maintain the adjusted position of the arm 85 of hub 83. Sufficient clearance is provided between bores 86 and 88 to permit the adjustment of the screw 89 relative to the rotative position of hub 83. To adjust the rotative position of hub 83 as well as the rotative position of power screw 43, nuts 91 and 92 are rotated to effect a lengthening (or a shortening) of that portion of screw 89 that extends between the bridging portion 58 of lever 55 and the arm 85 which in effect adjusts for the wear in the brake pads 37. As in the first described embodiment, the brake is applied by rotating the lever 55 in a counterclockwise direction as viewed in FIG. 9 whereby hub 83 imparts a rotation to the power screw 43 which translates into an axial movement to carriers 26 and 27 as described hereinabove. As in the first embodiment, lever 55 is recessed as at 82 to facilitate the movement and rotation of rod 81.

The modification shown in FIG. 10 is essentially identical to that shown in FIG. 9 except that arm member 85' of the hub 83' in FIG. 10 is longer than arm 85 of hub 83 (FIG. 9) to provide greater flexibility in the adjusting process. Its operation is identical to that described above with respect to FIG. 9.

A further modification of the invention is shown in FIG. 11 wherein a hub 83' with its hexagonal opening is mounted on the hexagonal end portion 50 of the power screw 43 and retained thereon as the other embodiments. Hub 83' has a projection or arm member 95 with a threaded bore 96 thereon receiving the threaded end of an adjusting screw or threaded rod 97. Screw or threaded rod 97 is received by a bore 98 in the bridging portion 58 of lever 55 and is retained in its position thereon by a pair of pins 99-100 mounted on opposite sides of the bridging portion 58. Thus no locking nuts are required to secure the screw 97 and rotation of screw 97 permits quick adjustment of the power screw 43 as described above.

It will be apparent that although a specific embodiment of the invention has been described, the invention is not limited to such specifically illustrated and described construction since variations may be made without departing from the principles of the invention.

I claim:

1. A disk brake for braking a rotatable brake disk comprising a stationary support, caliper member having a central opening defining a pair of opposed depending legs and a pair of opposed guideways, said depending legs located on opposite sides of said disk, a pair of braking pad means mounted on opposite sides of said disk and guided for movement toward and away from said disk on said guideways, said caliper member slidably mounted on guide rods secured to said support to position said caliper member over said rotor brake disk to provide a floating caliper member, a power screw journaled in one of said depending legs for actuating said braking pad means into braking action with said rotor brake disc, a cam secured to said power screw for rotating said screw, a control lever means mounted on one end of said screw and overlying said cam, adjusting means interconnecting said cam and said lever means to effect a rotation of said cam relative to said control lever means to effect an axial movement of said screw to provide adjustments for wear of said braking pad means, said one depending leg has a nut secured therein for receiving said power screw, said nut having a bore therethrough whose axis is parallel to the axis of said rotatable disk, said depending leg having a plurality of circumferentially bores that are registerable with said one bore in said nut, and a pin interconnected one of said plural bores in said depending leg with said one bore in said nut to provide means for adjusting the relative rotative position of said nut and said power screw.

2. A disk brake for braking a rotatable brake disk as set forth in claim 1 wherein said lever means has a threaded rod, said threaded rod having one end threadedly connected to said cam, and a nut secured to said threaded end of said threaded rod to secure said threaded rod to said cam wherein an axial movement of said rod with said cam relative to said lever means provides adjustments for wear of said braking pad means.

3. A braking apparatus comprising a fixed support, an axle journaled on said support for rotation, a rotor disk mounted on said axle for rotation therewith, said rotor disk having an axis of rotation, said rotor disk having a pair of annular braking surfaces, a caliper member connected to said fixed support for movement in an axial direction parallel to said axis of rotation and relative to said fixed support, said caliper member having a central opening defining a pair of depending leg members overlying said rotor disk and located on opposite sides of said rotor disk, said central opening having a pair of spaced guide surfaces, each of said guide surfaces lying in planes generally parallel to said axis of rotation, a pair of carriers mounted in said central opening having end portions slidingly contacting said guide surfaces, each of said carriers having brake pad thereon and located on opposite sides of said rotor disk for frictional engagement with said braking surfaces of said rotor disk, a power screw threadedly journaled in one of said depending leg members for axial movement to and from said rotor disk to exert a braking force on one of said brake pads against said rotor, one end of said power screw having a sleeve secured thereto for rotative movement therewith, said sleeve having only one projection thereon to define a caming element, a control lever arm journaled on said one end of said power screw, an adjustable screw means mounted on said lever arm, said screw means having one end surface perpendicular to the rotational axis of said screw means, a spring mounted on said lever arm, said spring directly engaging said projection and operatively biasing said projection on said sleeve into engagement with said one end surface of said adjustable screw means.

4. A braking apparatus as set forth in claim 3 wherein said power screw has a non linear configuration on said one end thereof, and said sleeve having a bore of the same configuration as said one end of said power screw for connection therewith.

* * * * *